United States Patent

Swanstrom, Jr.

[11] Patent Number: 5,987,752
[45] Date of Patent: Nov. 23, 1999

[54] TOOL FOR FARRIERS

[75] Inventor: John E. Swanstrom, Jr., Duluth, Minn.

[73] Assignee: Swanstrom Tools USA Inc., Superior, Wis.

[21] Appl. No.: 09/017,647

[22] Filed: Feb. 2, 1998

[51] Int. Cl.[6] ..................................................... B26B 17/00
[52] U.S. Cl. ............................ 30/186; 30/344; 76/104.1; 76/DIG. 5
[58] Field of Search ............................. 30/186, 175, 178, 30/179, 344, 341, 342, 349; 76/104.1, 106.5, DIG. 5, DIG. 10

[56] References Cited

U.S. PATENT DOCUMENTS

| | | | |
|---|---|---|---|
| 532,509 | 1/1895 | Whiting | 30/186 |
| 1,908,208 | 5/1933 | Yassenoff | 76/DIG. 5 |
| 2,202,340 | 5/1940 | Faist | 30/176 |

FOREIGN PATENT DOCUMENTS 0 497 508   8/1992   European Pat. Off. .................. 30/196

OTHER PUBLICATIONS

Photograph 1A showing a top view of a farrier nippers manufactured by Swanstrom Tools USA Inc. of Minnesota.
Photograph 1B showing a close–up of the interior of the jaw of the farrier nippers, shown on photograph 1A.
Photograph 2A showing a side view of a farrier nippers manufactured by GE Tool Company of California.
Photograph 2B showing a close–up view of the interior of the jaw of the farrier nippers shown on photograph 2A.

Primary Examiner—Hwei-Siu Payer
Attorney, Agent, or Firm—Faegre & Benson LLP

[57] ABSTRACT

An improved farrier nippers formed from two elongated members including handles, pivot regions and jaws. Blade members are formed separately from each elongated member and brazed into shelves of the jaws of the elongated members. Neck regions of the jaws of the elongated members each have an interior surface which is generally "V"-shaped. This facilitates removal of a portion of a work object which would otherwise obstruct a cut.

18 Claims, 4 Drawing Sheets

TOOL FOR FARRIERS

FIELD OF THE INVENTION

The present invention relates generally to cutting tools. Specifically, the present invention relates to an improved pivotable cutting tool such as a farrier nippers.

BACKGROUND

Farriery is the craft of shoeing horses. Prior to actually attaching a horse shoe to a horse's hoof, however, the hoof must be appropriately shaped to accept the shoe so as to allow the horse to maintain an appropriate gait. Shaping the horse's hoof prior to shoeing typically involves use of a number of tools, including a farrier nippers. Farrier nippers are used to trim the area of the hoof where the shoe is to be mounted. This is necessary because, somewhat like a human fingernail, this area grows over time.

Farrier nippers are formed from two elongated members, each member having a relatively long handle at a proximal end, a jaw at a distal end, and a flattened pivot region between the handle and the jaw. The two elongated members are attached by a pivot, which is typically a rivet, passing through the pivot regions of the two members so that the two members can pivot with respect to one another in a plane of motion of the nippers. The jaws of the elongated member are generally "C"-shaped and configured so that the interior concave surfaces of the "C"s oppose each other to form an interior edge of the jaws. Opposing blades are formed at die distal ends (the upper endpoint of the "C"s) of the jaws. The edges of the blades extend transversely in a direction which is perpendicular to the plane of motion of the nippers and must be relatively sharp and preferably relatively hard so that they retain their sharpness. A curved ("C"-shaped) neck attaches each blade to a base of its respective jaw adjacent to its respective pivot region. The interior concave surface of this neck is typically either flat or slightly rounded in prior art nippers.

Typically, the elongated members are formed by forging. Further, it is known to forge the blades and handles unitarily, that is as one piece, as a continuation of the elongated members. To be able to forge the relatively thin blades to their full transverse extent, relatively high forge pressures are required. As such, a forge hammer is often used in place of a forge press. The forge hammer is a relatively large machine that can produce forging pressures greater than that of a typical forge press. However, generally, a forge hammer is considerably more expensive than a typical forge press. Accordingly, to manufacture farrier nippers having blades formed unitarily with the elongated members can be relatively expensive.

Once the elongated members are formed, it is desirable to heat treat the edges of the blades to increase their hardness so that they will retain a relatively sharp edge, typically using "induction hardening." During the induction hardening process, the blade edge is heated using a conventional electrical induction coil to a relatively high temperature and then rapidly cooled.

It is also known to fabricate farrier nippers wherein blade members are formed separately from the elongated members. The blade members of nippers fabricated in this way are typically machined from a solid block of steel resulting in a substantially flat blade portion adjacent to a blade edge with a slot generally perpendicular to a plane of the flat blade portion located in a mounting portion of the blade member adjacent to the blade portion. The necks of the jaws of the elongated members of the nippers each have a tongue which is sized to closely mate with the slot of the mounting portion of the blade insert. Apertures extending perpendicularly to the plane of motion of the nippers are formed in the tongues to line up with transverse apertures in the mounting portions of each blade insert. Drive pins can be press fitted in the aligned apertures to attach the blade inserts to their respective elongated members.

Forming farrier nippers in this way allows the elongated members of the nippers to be fabricated using a forge press rather than a forge hammer because relatively high forge pressures are not necessary to form the thin, transversely extending blades. As such, overhead in manufacturing the nippers can be reduced. However, forming a blade insert, with its thin blade, apertures and slot from a block of metal can produce a relatively high amount of waste material. This can increase the manufacturing costs of the nippers.

As with most cutting tools, the blades of a farrier nippers are preferably hardened so that they will hold their edge. Typically, the blades are hardened using an induction hardening process. Induction hardening involves heating the blade above a critical temperature (preferably above 1500° F. for common steels) and then rapidly cooling it. The rapid cooling from above the critical temperature is responsible for the hardening of the blade and is usually referred to as "quenching." In production of farrier nippers, induction hardening is typically carried out as a separate manufacturing step. As such, it can add to the cost of manufacturing.

Farrier nippers are used by opening the jaws by spreading the handles, placing the blades on either side of a portion of the hoof wall of a horse's hoof to be removed, and closing the jaws to trim that portion. On occasion, the section of a hoof wall to be removed is bulkier (thicker) than the area where the cut will take place to remove bulky section. When this occurs, the bulky section can bind on a flat or rounded inside surface of the neck of the jaws and not allow the nippers to close entirely to make the necessary cut. Additionally, some farrier nippers have a "stop" where the base of the two "C's" of the jaws meet to prevent the blades from crossing over one another during a cut. A piece of hoof or other foreign material may get caught in the stop between the base of the two "C's" and prevent the jaws from closing entirely,, thereby preventing completion of the cut.

Accordingly, there is need for both improved design in farrier nippers and improved methods of manufacturing of farrier nippers. The present invention overcomes deficiencies in the prior art by providing increased cutting functionality. It further overcomes deficiencies in the prior art by not requiring the use of a forge hammer (as was required for unitary nippers), while avoiding the cost and complexity of the pinned-blade construction. Additionally, the present invention allows the elimination of a separate induction hardening step in manufacturing a farrier's nippers.

DETAILED DESCRIPTION

Figure 1:
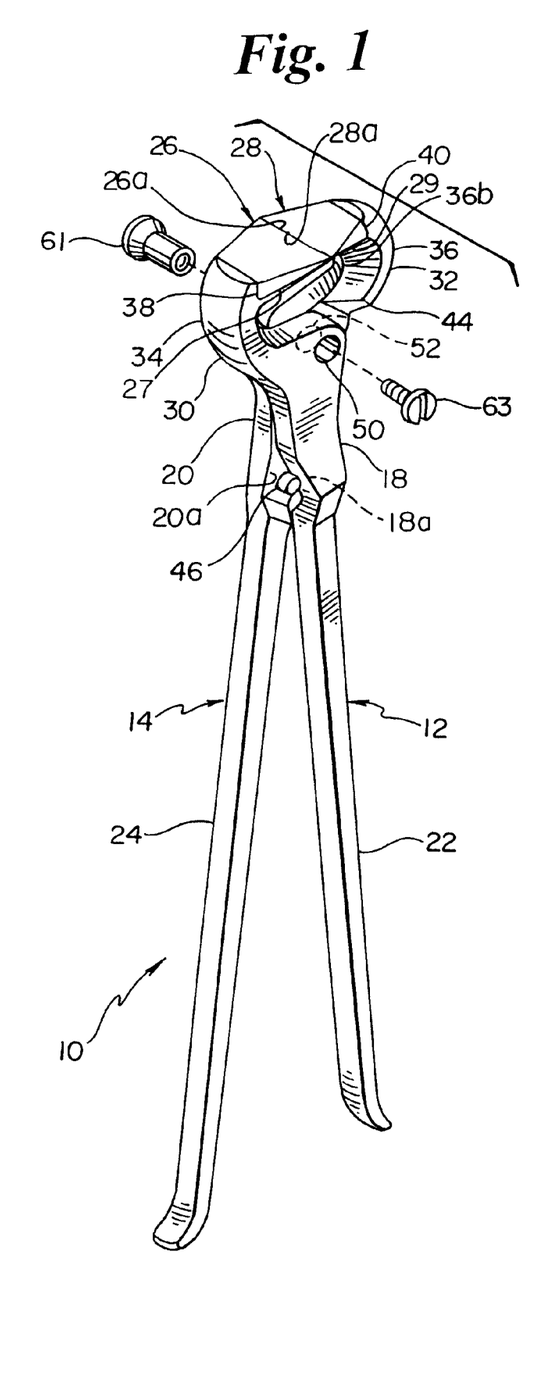
FIG. 1 is a partially exploded perspective view of farrier nippers having separately formed blade members, and "V"-shaped jaw necks in accordance with the present invention.

A farrier nippers 10 in accordance with the present invention is shown in FIG. 1. Nippers 10 are formed from a first elongated member 12 and a second elongated member 14 pivotally attached to one another by pivot 16 (shown in FIG. 5) so that first member 12 can pivot with respect to second elongated member 14 in a plane of motion of nipper 10. Elongated member 12 includes a first handle 22 at proximal end thereof, a generally "C"-shaped first jaw 30 at a distal end thereof, and a first pivot region 18 between first jaw 30 and first handle 22. Similarly, second member 14 includes a second handle 24 at proximal end thereof, a generally "C"-shaped second jaw 32 at a distal end thereof, and a second pivot region 20, between jaw 32 and handle 24.

Pivot 16 in pivot regions 18 and 20 allow elongated members 12 and 14 to pivot with respect to one another in a plane of motion of nippers 10 so that nippers 10 can be opened and closed. In an open position, jaws 30 and 32, and handles 22 and 24 are spread apart from one another. In a closed position, jaws 30 and 32, and handles 22 and 24 are in their respective positions of closest proximity. A first aperture 50 in pivot region 18 is aligned with a second aperture 52 in pivot region 20. Apertures 50 and 52 each have cylindrical interiors and extend in a direction transverse to the direction of motion of nippers 10. Pivot or fastener 16 is preferably generally cylindrical and received in apertures 50 and 52 in alignment with the cylindrical interiors of apertures 50 and 52. Pivot region 20 has a flat surface 20a and pivot region 18 has a flat surface 18a which faces flat surface 20a. Both flat surfaces 18a and 20a are parallel with the plane of motion of nippers 10. Pivot 16 movably holds the flat surface 18a against the flat surface 20a. As such, members 12 and 14 can pivot with respect to each other in a plane perpendicular to the cylindrical pivot 16, which is the plane of motion of nippers 10.

Figure 2:
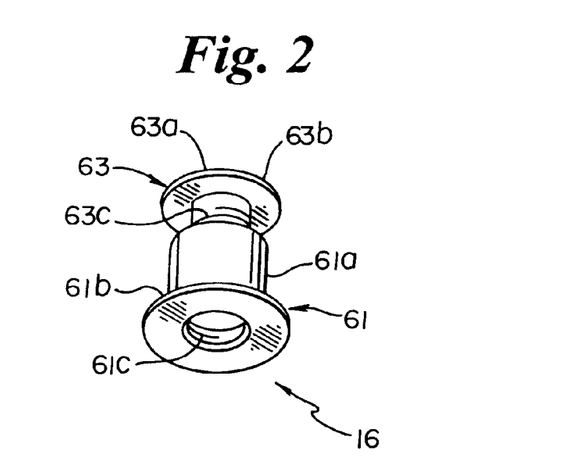
FIG. 2 is perspective view of the pivot shown in FIG. 1.

As shown in FIGS. 1 and 2, pivot 16 preferably includes a female mating member 61 and a male mating member 63. Female mating member 61 includes a hollow cylinder 61a extending from flange 61b and having interior threads 61c. Male mating member 63 includes a screw 63a having a head 63b and exterior threads 63c sized to mate with interior threads 61c of member 61. Aperture 52 is sized to slidingly receive cylinder 61a. However, flange 61b prevents member 61 from passing entirely through aperture 52. Also, it is to be understood that the diameter of aperture 50 is slightly smaller than that of aperture 52 and, as such, cylinder 61a must be pressed into aperture 50 in an interference fit. Accordingly, to pivotally fasten member 12 to member 14, member 61 is placed through aperture 52 and cylinder 61a is pressed into aperture 50. Threads 63c of screw 63a are then fully engaged with the threads 61c of member 61 to secure member 61 in apertures 50 and 52. In this way, member 61 rotates within aperture 52 of member 14 but not within aperture 50 of member 12 as members 12 and 14 are rotated relative to one another. It is also within the ambit of the present invention to pivotally connect member 12 to member 14 by other conventional pivot members such as, but not limited to, screws and rivets.

Regardless of the type of fastener used to pivotally connect members 12 and 14, over time, the connection between elongated members 12 and 14 can loosen as nippers 10 is used so that members 12 and 14 can move or "wiggle" with respect to one another in a direction at least partially transverse to the plane of motion of nippers 10. If pivot 16 as described above is used to pivotally connect members 12 and 14, this wiggle can be caused by member 61 pulling slightly out of aperture 50 or by a plastic deformation of either or both of member 61 or 63. Accordingly, the wiggle can be advantageously reduced by periodically tightening screw 63a such that member 61 is pulled snugly against pivot region 20 and member 63 is pulled snugly against pivot region 18.

Further, it is possible that one of either elongated members 12 or 14 and/or one of either blade members 26 or 28 may become damaged. By using a pivot such as pivot 16 described above, elongated member 12 can be separated from elongated member 14 by unscrewing screw 63a and removing cylinder 61a from apertures 50 and 52 by driving elongated member 12 out of engagement with elongated member 14. The damaged member—forging, scrivet or brazed insert(s)—can then be replaced. Cylinder 61a can be placed back through aperture 52 and press fit into aperture 50 by compression. Screw 63a can then be replaced in female member 61. By using pivot 16 to connect elongated member 12 to elongated member 14, the above described replacement process can be advantageously accomplished without the need to drill out a rivet or replace the pivot.

Figure 3:
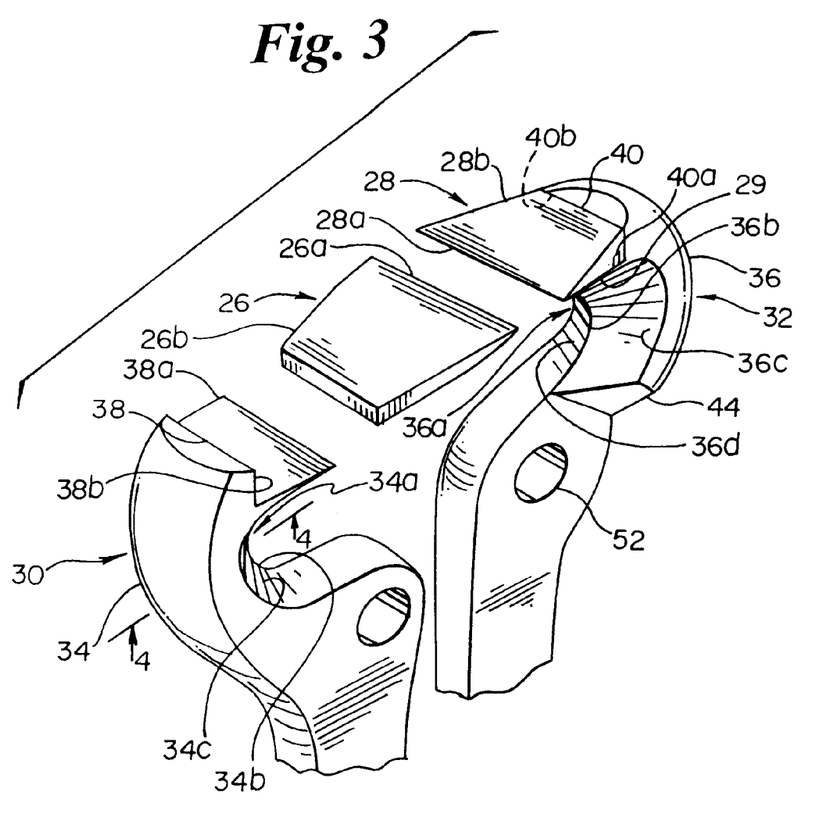
FIG. 3 is a fragmentary exploded view of the farrier nippers shown in FIG. 1 illustrating how the blade members thereof mate with the jaws thereof.

Opposed, first and second blade members 26 and 28, respectively, are at distal ends of first and second jaws 30 and 32, respectively, and have first and second blade edges 26a and 28a, respectively, which extend in a direction transverse to the plane of motion of nippers 10. Jaws 30 and 32 are generally C-shaped and include first and second necks 34 and 36, respectively, and first and second lands or shelves 38 and 40, respectively. As shown in FIG. 3, shelves 38 and 40 include rear walls 38b and 40b, respectively, and lips 38a and 40a, respectively. In the embodiment of FIG. 1, a first shoulder (not shown) and second shoulder 44 extend up from flat surfaces 18a and 20a, respectively, of pivot regions 18 and 20, respectively. It is to be understood that the first shoulder can, but need not, be identical to the second shoulder 44. First neck 34 begins at the first shoulder and second neck 36 begins at second shoulder 44. First neck 34 curvedly extends to where first shelf 38 begins. Similarly, second neck 36 curvedly extends to where second shelf 40 begins. Though in the embodiment shown, jaws 30 and 32 are generally C-shaped, it is also contemplated to form jaws in any other similar appropriate shape, such as a V-shape, such that clearance is provided between necks 34 and 36 when nippers 10 are closed.

A stop 46 is preferably located on flat surface 20a of pivot region 20. In the embodiment shown in FIG. 1, stop 46 is a cylindrical protrusion from surface 20a. When nippers 10 are closed, stop 46 engages pivot region 18 of elongated member 12 to allow blade edges 26a and 28a to abut one another but not substantially overlap or interfere with one another.

FIG. 3, is a partial, exploded isometric view of nippers 10. As shown in FIG. 3, first blade members 26 and 28 are substantially trapezoidal in shape and have a mounting shanks 26b and 28b, respectively. Other shapes for blades members 26 and 28 are also contemplated. In the embodiment shown in FIG. 1, blade members 26 and 28 are preferably brazed into shelves 38 and 40, respectively. Other methods of rigidly securing blade members 26 and 28 to jaws 30 and 32, such as by soldering, welding, adhesive, screws, pins, or other known means, are also within the scope of the present invention.

First shelf 38 has a lower lip 38a and second shelf 40 has lower lip 40a. Mounting shanks 26b and 28b of blade members 26 and 28, respectively, are sized to fit onto lower lips 38a and 40a, respectively. In this way, when blade members 26 and 28 are brazed or otherwise rigidly fixed in shelves 38 and 40, respectively, lower lips 38a and 40a, respectively, provide support for blade members 26 and 28 to help prevent them from shifting downward away from shelves 38 and 40, respectively, during use of nippers 10.

Shelves 38 and 40 also have rear walls 38b and 40b, respectively, which are integrally formed with jaws 30 and 32 respectively. As such, blade members 26 and 28 are provided with rearward support from jaws 30 and 32, respectively. In this way, rearward pressure on blade members 26 and 28 which is caused by use of nippers 10 in cutting, can be borne directly by forged jaws 30 and 32, respectively. This provides desirable alignment and strength to the blade member/jaw assemblies of nippers 10.

Figure 4:
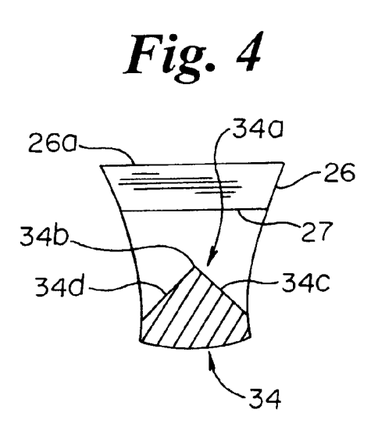
FIG. 4 is a sectional view of the farrier nippers shown in FIG. 1 taken along section line 4—4 of FIG. 3 showing a generally "V"-shaped jaw neck thereof
Figure 6:
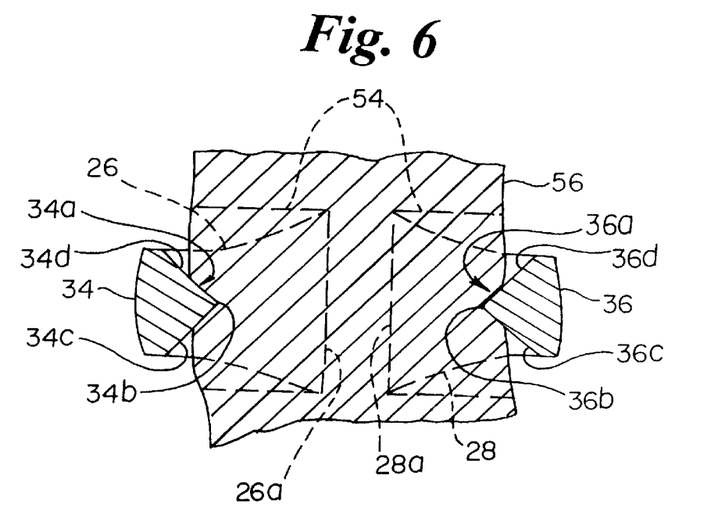
FIG. 6 is a sectional view of the farrier nippers shown in FIG. 5 taken along section line 6—6 of FIG. 5.

As shown in FIGS. 3 and 4, an interior surface 34a of first neck 34 forms an edge 34b. From edge 34b interior surface 34a extends outward along first and second adjacent faces 34c and 34d, respectively, so that interior surface 34a is substantially "V"-shaped. Similarly, as shown in FIGS. 3 and 6, an interior surface 36a of second neck 36 forms an edge 36b to form a "V"-shaped interior surface. From edge 36b, interior surface 36a extends outward along third and fourth adjacent faces 36c and 36d. Substantially "V"-shaped interior surfaces 34a and 36a oppose each other, as can be seen most clearly in FIG. 6.

Figure 5:
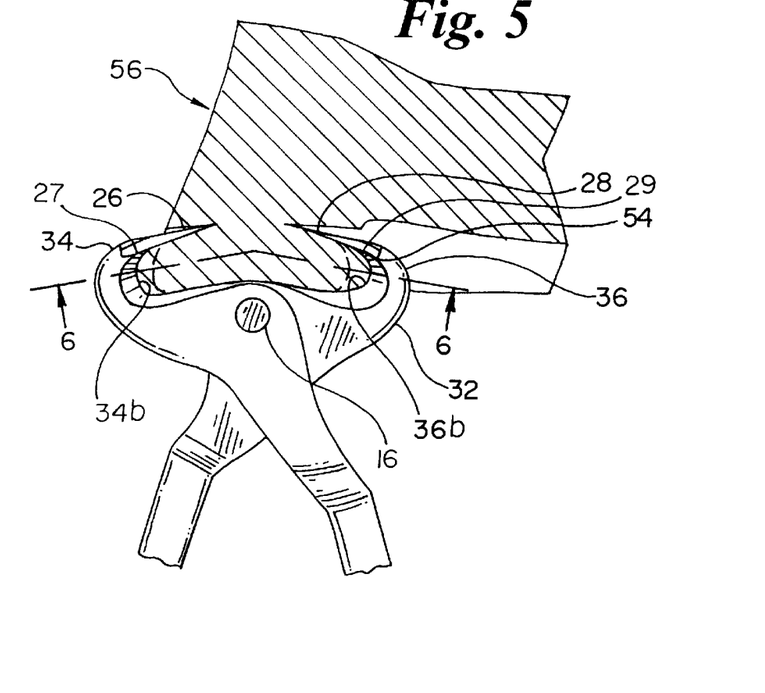
FIG. 5 is a side view of the farrier nippers shown in FIG. 1 illustrating how the "V"-shaped jaw necks can facilitate cutting a work object.

This construction is advantageous for those occasions, as illustrated in FIGS. 5 and 6, where it is necessary to remove a portion 56 of a work object 52 (such as a horses hoof) which is larger than the clearance between first neck 34 and second neck 36 when nippers 10 are closed. In such instances, it is possible that the necks 34 and 36 will be obstructed by outer regions of portion 54 so that jaws 30 and 32 cannot completely close. In such instances edges 34b and/or 36b will compress and even cut into portion 54 as shown in FIG. 6. Then, "V"-shaped interior surfaces 34a and/or 36a can act as wedges to move cut or compressed portion 54 out of the path of necks 34 and 36, respectively, to allow blade members 26 and 28, respectively, to close until edges 26a and 28a abut each other.

In general, "V"-shaped interior surface 34a and/or 36a and one or more of opposed surfaces 34c, 34d, 36c and/or 36d, act as a wedge or wedges to push a portion of a work object, which would otherwise obstruct either one or both necks 34 and/or 36, out of the plane of motion of nippers 10 to allow nippers 10 to completely sever portion 54 from the remainder of work object 56. This situation could arise regardless of whether the obstructing portion is to be removed, or simply needs to be compressed or cut into to allow completion of a cut by blades 26 and 28. In any of these situations, nippers 10 would be able to advantageously make the required cut without the need of additional conditioning of a work object such as filing or additional cuts.

Figure 4A:
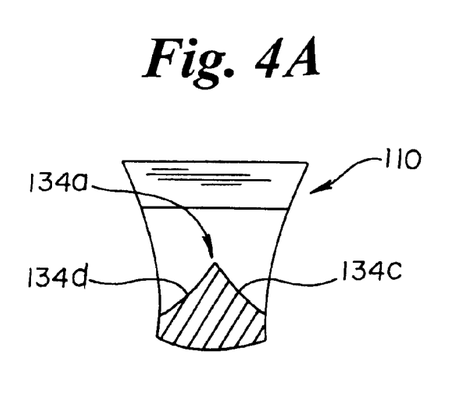
FIG. 4A is a sectional view of a farrier nippers in accordance with the present invention taken along the same section line as FIG. 4 and showing an alternate embodiment of a generally "V"-shaped jaw neck thereof

It is also contemplated to form the opposed surfaces of the generally "V"-shaped necks to be curved in either a convex or concave configuration. FIG. 4A shows an alternate embodiment of the neck region of a farrier nippers 110 in accordance with the present invention wherein opposed surfaces 134c and 134d of a first generally "V"-shaped neck 134a are each formed having a concave curvature. Opposed surfaces of a second generally "V"-shaped neck (not shown) can be similarly formed. Generally "V"-shaped neck 134a operates in the same way as neck 34 to displace a portion of a work object which would otherwise obstruct neck 134a when making a cut.

It is to be understood that the present invention can also be used in fields other than farriery. For example, nippers such as nippers 10 or 110 can also be used for trimming tree branches or other brush. It is also considered to used the nippers such as nippers 10 or 110 in the plastics molding industry to trim flashing and other excess plastic from plastic molded parts. Use of nippers in accordance with the present invention is contemplated for use in any application wherein a portion of an object requires trimming flush with a surface of the object.

A method of manufacturing nippers 10 includes forming elongated members 12 and 14, including jaws 30 and 32, pivot regions 18 and 20 and shelves 38 and 40, separately from blade members 26 and 28. First and second elongated members 12 and 14, respectively, are preferably fabricated of steel and are preferably formed by forging. Preferably, first and second elongated members 12 and 14 are formed from tool steel. It is also contemplated, however, to fabricate first and second elongated members 12 and 14, respectively, from other substantially rigid material and form members 12 and 14 by injection molding, stamping, casting, machining, or other known processes. First and second blade members 26 and 28 are preferably formed by machining a strip of steel but can also be formed using other methods such as forging. Blade members 26 and 28 can then be fixedly secured into shelves 38 and 40, respectively, preferably by brazing, resulting in the formation of braze joints (not shown) between blade member 26 and shelf 38 and, separately, blade member 28 and shelf 40. Edges 26a and 26b of blade members 26 and 28, respectively, can be formed by grinding or other known methods and sharpened either before or after fixedly securing blade members 26 and 28 into shelves 38 and 40, respectively. Edges 26a and 26b of blade members 26 and 28, respectively, can also be induction hardened as known in the art either before or after fixedly securing blade members 26 and 28 into shelves 38 and 40. Preferably, however, as discussed more fully below, heat in blade members 26 and 28 which comes from being brazed into shelves 38 and 40, respectively, acts to harden blade edges 26a and 26b, respectively. Elongated members 12 and 14 can then be pivotally attached via pivot 16. Pivot 16 is preferably formed from steel by machining or other known methods.

As discussed in the background section, less forge pressure is required when forming the handle, pivot region, and jaw sections of a farrier nippers as one piece and separately from the blade members. Accordingly, because first and second elongated members 12 and 14 do not include blade members 26 and 28 when formed, less forge pressure is required to form members 12 and 14. Thus, a relatively less expensive forge press, as opposed to a forge hammer, can be used in fabricating nippers 10. This advantageously reduces manufacturing overhead in production of nippers 10.

It is to be understood that preferably, the heat from brazing blade members 26 and 28 into shelves 38 and 40, is used to harden blades 26 and 28, respectively. Typically, the blades of farrier nippers are hardened by induction hardening as known in the art. As noted in the background section, induction hardening involves heating the blade above a critical temperature (preferably above 1500° F. for common steels) and then rapidly cooling, or quenching it. The rapid cooling from above the critical temperature is responsible for the hardening of the blade. Brazing blade members 26 and 28 into shelves 38 and 40 also requires that blade member edges 26*a* and 28*a* be heated to a relatively high temperature, particularly because edges 26*a* and 28*a* are relatively close to mounting shanks 26*b* and 28*b*, respectively. However, it was previously thought that heating the blades of the nippers by brazing, either before or after induction hardening, would have a determined effect on the hardness of the blades.

It has been found in the practice of the present invention, however, that the heating and cooling of blades members 26 and 28 caused by brazing blade members 26 and 28, respectively, can act to harden blades members 26 and 28 to a degree such that a separate hardening step can be omitted. In order to securely braze blade 26 into shelf 38, brazing flux and brazing material, both as known in the art, are applied between shelf 38 and blade member 26. Pressure is applied to blade member 26 in a direction towards backwall 38*b* and lip 38*a*. Blade member 26, shelf 38, the flux and the brazing material are all simultaneously exposed to an induction coil producing a radio frequency, oscillating electromagnetic field to heat blade member 26, shelf 38, the flux and the brazing material as known in the art and commonly used for induction hardening. Though temperatures of only about 1250° F. to 1350° F. are generally necessary to braze blade 26 onto shelf 38, the electromagnetic field is preferably applied to heat blade member 26, shelf 38, the brazing material and the flux to above 1500° F. so that blade member 26 will be hardened when it is cooled back to room temperature (below approximately 150° F). Blade member 26 is then preferably air quenched either by forced or natural convection, to room temperature. Blade member 28 is preferably hardened and simultaneously brazed to shelf 40 in the same way. It is also within the scope of the present invention to quench blades 26 and 28 using conventional oil, water soluble oil, or other quench media.

By brazing blade members 26 and 28 into shelves 38 and 40, as described, nippers 10 can be advantageously manufactured without an additional induction hardening step. If induction hardening is desired, however, it can be done either before or after fixedly securing blade members into shelves 38 and 40. Further, though heating of blades 26 and 28, shelves 38 and 40, flux and brazing material is preferably accomplished through use of an oscillating electromagnetic field, it is also contemplated that these components may be heated to above 1500° F. using other methods, including, but not limited to, the use of a torch or brazing oven.

As noted above, tool steel is preferably used to form blade members 26 and 28; most preferably O1 tool steel is used. Though O1 tool steel is typically oil quenched when hardening, it was found that because blade members 26 and 28 are relatively thin, it is adequate to air cool blade member 26 and 28 to harden them after being heated. It is to be understood, however, that other types of steel can be used in the fabrication of blade members 26 and 28. For example, other steels such as, but not limited to: O1, O2, O6 and O7 oil-hardening steels; water-hardening steels; air-hardening steels; high carbon and high chromium type cold-work tool steels; shock-resisting tool steels; chromium types, tungsten type and molybdenum type hot-work tool steels; and molybdenum type and tungsten type high speed tool steels.

As discussed above, blade members 26 and 28 fit into shelves 38 and 40, respectively, having rear walls 38*b* and 40*b*, respectively, and lower lips 38*a* and 40*a*, respectively, which provide relatively strong mechanical support for blade members 26 and 28 during use of nippers 10. Further, to provide the bond between blade members 26 and 28, they are brazed into shelves 38 and 40, respectively. Accordingly, blade members 26 and 28 do not require slots, cutouts, apertures, pins or other mechanical support features to provide a relatively strong and rigid bond between blade members 26 and 28 and jaws 30 and 32, respectively. Thus, blade members 26 and 28 can be machined from steel blanks that are relatively close to the dimensions of blade members 26 and 28. Forming blade members 26 and 28 in this way produces relatively little scrap and, therefore, can advantageously reduce the cost of producing nippers 10. Nippers 110 can be manufactured in substantially the same way as nippers 10.

Figures 7, 8, 9:
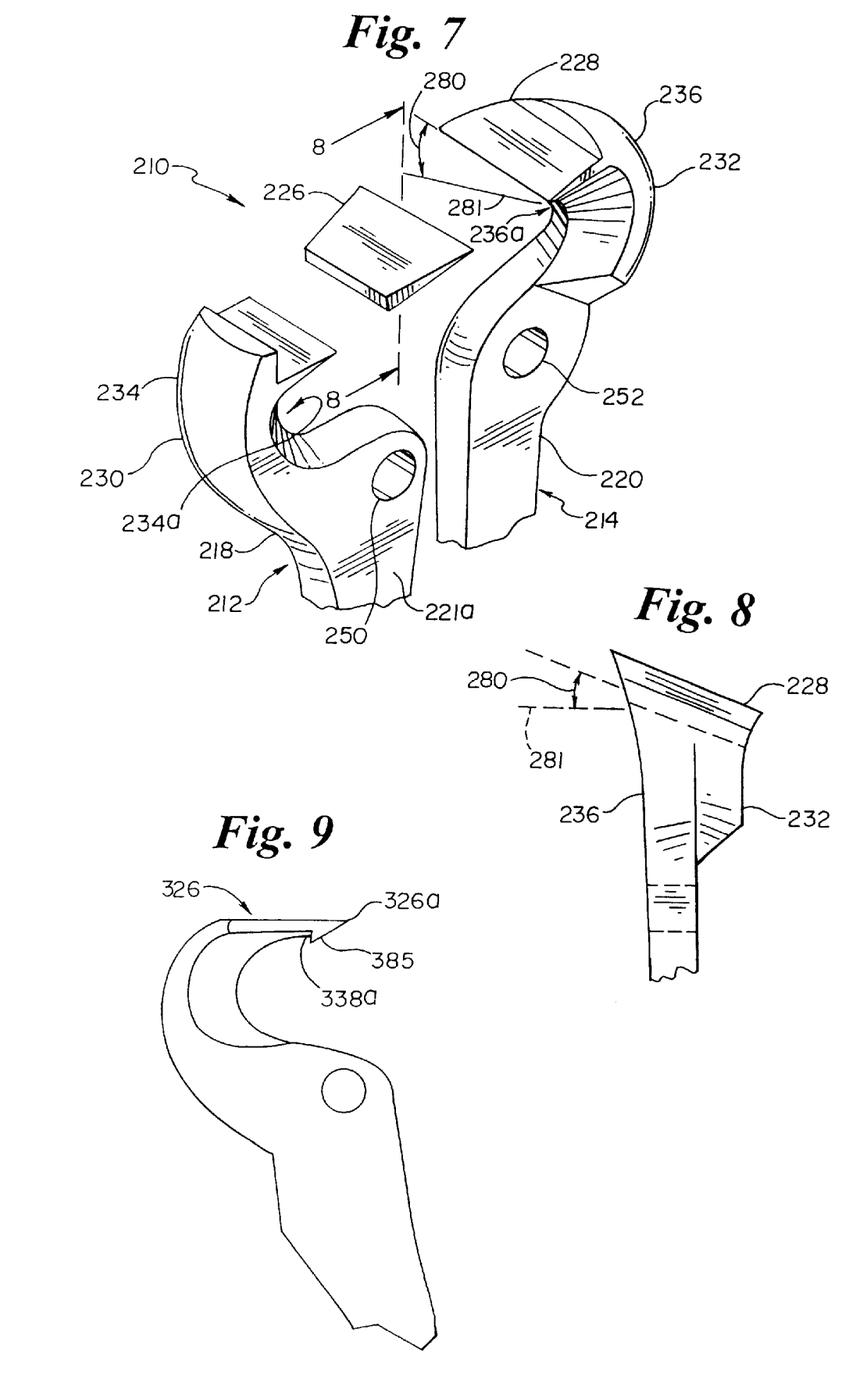
FIG. 7 is a perspective view of an alternate embodiment of a pivotable cutting tool in accordance with the present invention.
FIG. 8 is a sectional view of FIG. 7 taken along line 8—8 of FIG. 7.
FIG. 9 is a side view of one jaw of a cutting tool in accordance with the present invention showing an alternate blade design.

An alternate embodiment of a cutting tool in accordance with the present invention is shown in FIG. 7. Cutting tool 210 includes first and second member 212 and 214, respectively. First member 212 has a first handle (not shown), first pivot region 218, first generally "C"-shaped jaw 230 and first blade 226. Second member 214 has a second handle (not shown), second pivot region 220, second generally "C"-shaped jaw 232 and second blade 228. As tool 210 is opened and closed, jaws 230 and 232 along with blades 226 and 228, pivot about a pivot (not shown) placed through apertures 250 and 252 in pivot regions 218 and 220, respectively, and in a plane of motion of tool 210. As such, the plane of motion of tool 210 is parallel with flat surface 221*a* of pivot region 218. As shown, tool 210 is substantially the same as nippers 10 with the exception that blades 226 and 228 are tilted at an angle 280 other than 0 degrees with respect to a perpendicular 281 to the plane of motion of tool 210. That blade 228 is tilted at angle 280 with respect to a perpendicular 281 of the plane of motion of tool 210 can clearly be seen in FIG. 8, which is a sectional view of tool 210 taken along section line 8—8 of FIG. 7. In the embodiment shown in FIGS. 7 and 8, blades 226 and 228 are tilted at an angle 280 of approximately 30°. However, it is contemplated to tilt blades 226 and 228 at any angle from 0 to 180 degrees, inclusive, with respect to the perpendicular 281 to the plane of motion of tool 210.

By tilting blades 226 and 228 as shown in FIG. 7, an elongated object such as a branch from a tree or other brush, can be inserted between blades 226 and 228 without being obstructed by pivot regions 218 and 220. In this way, the tilted orientation of blades 226 and 228 as described above facilitates flush cutting of an elongated object by tool 210.

Additionally, like nippers 10, jaws 230 and 232 have necks 234 and 236 which have generally "V"-shaped inner surfaces 234*a* and 236*a*. In this way, as with nippers 10, "V"-shaped interior surfaces 234*a* and 236*a* can act as a wedge or wedges to push a portion of a work object, which would otherwise obstruct either one or both necks 234 and/or 236, out of the plane of motion of tool 210 to allow tool 210 to completely cut the work object. It is also contemplated to form inner surfaces 234*a* and 236*a* having concave curvatures as shown in FIG. 4A. Cutting tool 210 can be manufactured in substantially the same way as nippers 10.

FIG. 9 shows an alternate design for the blade member of a cutting tool such as tool 10, 110 or 210. As shown in FIG. 9, blade member 326 includes a blade edge 326*a* having a barb 385 which is co-extensive with the width of blade edge 326*a*. Barb 385 extends over lip 338*a*. In this way, as a work object is cut, the portion of the work object which has been cut will advantageously have less frictional interference with blade member 326 and the exposed face of lip 338a. This can increase ease of cutting. Additionally, during a cut, barb 385 will experience a force acting on it which would tend to push it generally away from the direction of the cut. And, because bard 385 extends over lip 338a, lip 338a acts to support blade member 326 against this force during a cut. This can advantageously strengthen a cutting tool using a blade designed such as blade member 326. Though only one blade member is shown in FIG. 9, it is to be understood that the opposing blade member of a cutting tool such as farrier nippers 10, or cutting tools 110 and 210 can also include a barb such as barb 385. Blade member 326 can be formed in substantially the same way as blade member 26 of nipper 10. Barb 385 can be machined, forged, or otherwise formed in blade member 326.

Though the present invention has been described with reference to preferred embodiments, those skilled in the art will recognize that changes can be made in form and detail without departing from the spirit and scope of the invention. For example, it is to be understood that nippers 10 and 110 and cutting tool 210 can be used in fields other than farriery and for purposes other than trimming a horses hoof.

What is claimed is:

1. A cutting tool, comprising:
   first and second elongated members,
   the first elongated member having a first handle at a proximal end, a first jaw at a distal end and having a distal tip formed into a first lower lip member, and a pivot region between the first handle and the first jaw; and
   the second elongated member having a second handle at a proximal end, a second jaw at a distal end and having a distal tip formed into a second lower lip member, and a pivot region between the second handle and the second jaw,
   the first elongated member pivotally attached to the second elongated member in the pivot region of each elongated member permitting the members to pivot with respect to each other in a plane of motion such that the cutting tool can be placed in an open position by pivoting the first handle away from the second handle and the cutting tool can be placed in a closed position, by pivoting the first handle towards the second handle, the cutting tool acting to cut as it closes;
   first and second blades respectively supported by the first and second lower lips at the respective distal tips of the first and second jaws, the first and second blades having respective opposed first and second edges for cutting a work object; and
   first and second braze joints, respectively attaching the first blade to the distal tip of the first jaw and the second blade to the distal tip of the second jaw;
   wherein the first jaw includes a first rear wall formed integrally therewith generally parallel to the first edge for supporting the first blade during a cut.

2. The cutting tool of claim 1 wherein the second jaw includes a second rear wall formed integrally therewith generally parallel to the second edge for supporting the second blade during a cut.

3. In a cutting tool of the type having first and second elongated members, the first elongated member having a first handle at a proximal end, a first jaw at a distal end thereof and having a distal tip, and a pivot region between the first handle and the first jaw, the second elongated member having a second handle at a proximal end, a second jaw at a distal end thereof and having a distal tip, and a pivot region between the second handle and the second jaw, the first elongated member pivotally attached to the second elongated member in the pivot region of each elongated member permitting the members to pivot with respect to each other in a first plane of motion such that the cutting tool can be placed in an open position by pivoting the first handle away from the second handle and the cutting tool can be placed in a closed position, by pivoting the first handle towards the second handle, the cutting tool acting to cut as it closes; and first and second blades respectively fixedly connected to the distal tips of the first and second jaws, the first and second blades having respective opposed edges for cutting a work object, the improvement in combination therewith comprising:
   a generally V-shaped cross section, taken along a second plane generally perpendicular to the first plane of motion, on at least one of the first and second jaws operable to displace a work object between the jaws to prevent obstruction of the cutting operation of the blades.

4. The cutting tool of claim 3 wherein each of the first and second jaws have generally V-shaped cross sections opposed to each other.

5. The cutting tool of claim 4 wherein each of the first and second blades are substantially planar steel inserts each having a shank and a cutting edge.

6. The cutting tool of claim 5 wherein the first jaw includes a first shelf and the second jaw includes a second shelf and the shank of the first blade is retained in the first shelf and the shank of the second blade is retained in the second shelf such that the cutting edge of each blade extends transverse to the direction of motion of the cutting tool.

7. The cutting tool of claim 6 wherein the first shelf includes a first lower lip and the second shelf includes a second lower lip, the first and second lower lips respectively supporting the first and second blades during a cut.

8. The cutting tool of claim 7 wherein the first shelf includes a first rear wall and the second shelf includes a second rear wall, the first and second rear walls respectively formed integrally with the first and second jaws and for respectively supporting the first and second blades during a cut.

9. The cutting tool of claim 8 wherein the first blade includes a first barb near the cutting edge thereof and the second blade includes a second barb at the cutting edge thereof, the first barb extending over the first lower lip to support the first blade during a cut and the second barb extending over the second lip to support the second blade during a cut.

10. The cutting tool of claim 6 wherein the first blade is brazed to the first jaw and the second blade is brazed to the second jaw such that a first braze joint in between the first blade and the first jaw and a second braze joint is between the second blade and the second jaw.

11. The cutting tool of claim 10 wherein the first and second jaws are generally C-shaped.

12. The cutting tool of claim 3 wherein at least one of the first and second jaws includes at least two substantially planar surfaces which cross section is generally V-shaped.

13. The cutting tool of claim 3 wherein at least one of the first and second jaws includes at least two concave surfaces which cross section is generally V-shaped.

14. The cutting tool of claim 3 wherein each of the first and second blades includes a barb.

15. A method of fabricating a cutting tool, comprising the steps of:

forming a first elongated member and a second elongated member, the first elongated member having a handle at a proximal end, a first jaw at a distal end and a pivot region between the handle and the first jaw, the second elongated member having a handle at a proximal end, a second jaw at a distal end and a pivot region between the handle and the second jaw;

forming a first substantially planar blade member from a substantially planar sheet of material and a second substantially planar blade member from a second substantially planar sheet of material;

brazing the first blade member onto a distal tip of the first jaw and the second blade member onto a distal tip of the second jaw so that the heat generated from the brazing process acts to harden edges of the first and second blade members;

pivotally attaching the pivot region of the first elongated member to the pivot region of the second elongated member such that by pivoting the handle of the first elongated member towards the handle of the second elongated member the first blade member pivots towards the second blade member to allow a work object placed between the first and second blade members to be cut;

wherein forming the first and second substantially planar blade members from substantially planar strips of rigid material reduces the amount of scrap material generated in forming the blade members.

16. The method of claim 15 wherein the step of pivotally attaching permits the cutting tool to be pivotable in a plane of motion and the first and second substantially planar blade members each have an edge extending transverse to the plane of motion.

17. The method of claim 16 wherein:

the step of forming the first elongated member and the second elongated member includes forming a first shelf at a distal tip of the first jaw and a second shelf at a distal tip of the second jaw; and the step of rigidly mounting the first blade member onto the distal tip of the first jaw and the second blade member onto the distal tip of the second jaw includes brazing the first blade member into the first shelf and brazing the second blade member into the second shelf.

18. The method of claim 15 wherein the step of forming the first elongated member and the second elongated member includes forming a substantially C-shaped jaw at the distal end of each elongated member.

\* \* \* \* \*